United States Patent
Van Der Meer et al.

(10) Patent No.: US 9,049,961 B2
(45) Date of Patent: Jun. 9, 2015

(54) LIQUID CARTRIDGE FOR USE IN A BEVERAGE SYSTEM

(75) Inventors: Sijtze Van Der Meer, Hoogeveen (NL); Gertjan Drent, Groningen (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 2133 days.

(21) Appl. No.: 10/584,377

(22) PCT Filed: Dec. 20, 2004

(86) PCT No.: PCT/IB2004/052858
§ 371 (c)(1),
(2), (4) Date: Jun. 22, 2006

(87) PCT Pub. No.: WO2005/063093
PCT Pub. Date: Jul. 14, 2005

(65) Prior Publication Data
US 2007/0158366 A1    Jul. 12, 2007

(30) Foreign Application Priority Data
Dec. 22, 2003  (EP) .................................... 03104870

(51) Int. Cl.
A47J 31/06 (2006.01)
A47J 31/44 (2006.01)

(52) U.S. Cl.
CPC .................................. A47J 31/4485 (2013.01)

(58) Field of Classification Search
USPC ................... 99/293, 295, 279, 290, 300, 294; 261/78.1; 366/101, 163.1, 163.2, 167.1
See application file for complete search history.

(56) References Cited

U.S. PATENT DOCUMENTS

| | | | |
|---|---|---|---|
| 3,292,527 A | | 12/1966 | Stasse |
| 4,922,810 A | * | 5/1990 | Siccardi ....................... 99/323.1 |
| 5,052,289 A | * | 10/1991 | Di Girolamo ................... 99/452 |
| 5,335,588 A | * | 8/1994 | Mahlich .......................... 99/293 |
| 5,472,719 A | * | 12/1995 | Favre .................................. 426/77 |
| 5,473,972 A | * | 12/1995 | Rizzuto et al. ................... 99/290 |
| 5,738,002 A | * | 4/1998 | Marano-Ducarne ............ 99/293 |
| 5,768,981 A | | 6/1998 | Cicchetti |
| 5,862,740 A | * | 1/1999 | Grossi ............................. 99/293 |
| 6,289,796 B1 | | 9/2001 | Fung |
| 6,792,980 B1 | * | 9/2004 | Cortese ............................ 141/1 |
| 6,854,381 B2 | | 2/2005 | Fischer |
| 7,377,454 B2 | | 5/2008 | Klopfenstein |
| 2006/0233921 A1 | | 10/2006 | Mock et al. |

FOREIGN PATENT DOCUMENTS

| | | |
|---|---|---|
| EP | 0449533 A | 2/1991 |
| EP | 0 858 757 | 8/1998 |
| JP | 61245828 A | 11/1986 |
| JP | 2003180526 A | 7/2003 |

* cited by examiner

Primary Examiner — Dana Ross
Assistant Examiner — Renee L Miller

(57) ABSTRACT

A device for preparing a heated liquid for use with a beverage-making appliance includes a liquid transport channel in communication with a liquid reservoir which discharges into a first chamber. The first chamber includes a steam inlet which is connectable to a steam generator. A second chamber of the device is connected to the first chamber via a restriction and has a liquid outlet. The device is in the form of a cartridge n which the liquid reservoir, the liquid transport channel, the first chamber, the steam inlet, the restriction, the second chamber, and the liquid outlet are provided. All components of the device are integrated into one cartridge, so the cartridge can be discarded after use.

25 Claims, 6 Drawing Sheets

LIQUID CARTRIDGE FOR USE IN A BEVERAGE SYSTEM

Figure 1:
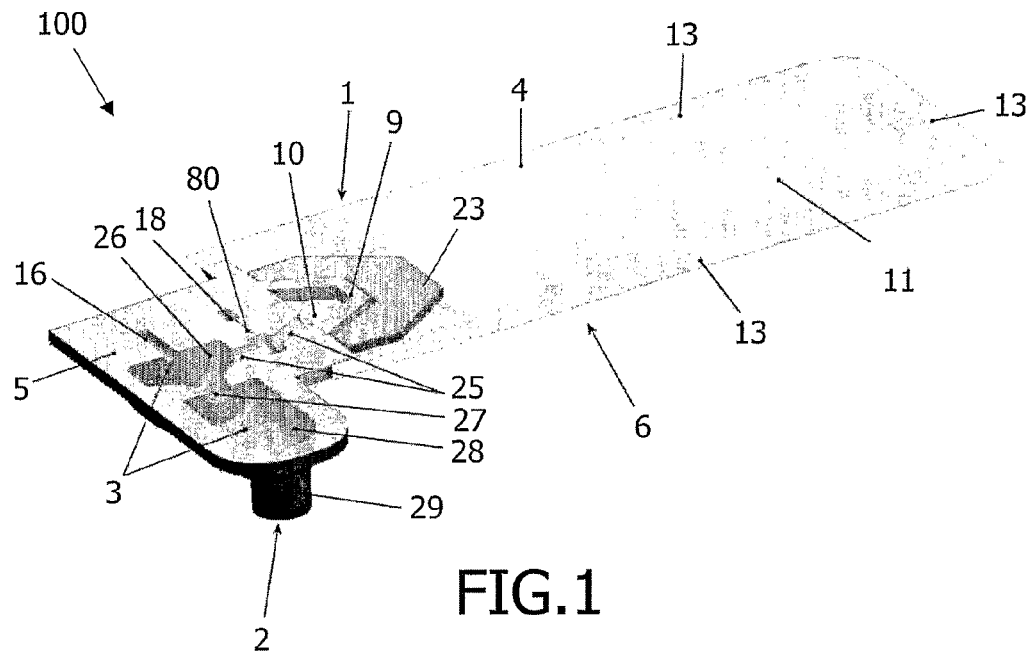

The invention relates to a device for preparing a heated liquid, said device comprising a liquid transport channel in communication with a liquid reservoir, a steam inlet which is connectable to a steam generator, a liquid outlet, and means for transporting a combined flow of at least liquid and steam to the liquid outlet.

The invention furthermore relates to a beverage-making appliance for use with such a device for preparing a heated liquid and to a system for preparing a beverage comprising a beverage-making appliance and a device for preparing a heated liquid.

A device as described in the opening paragraph is known, for example, from EP 0858757A1. The known device is a device for use with an espresso machine and comprises a liquid transport channel in communication with a liquid reservoir. In this device, the liquid comprises milk. The liquid transport channel discharges into a first chamber, which comprises a steam inlet which is connectable to a steam generator of the espresso machine. A second chamber, in this device a channel, is connected to the first chamber via a restriction and has a liquid outlet. During operation, milk and air are drawn into the first chamber by an underpressure in the first chamber. In the first chamber, steam is mixed with this milk and air to heat the mixture, after which the mixture is transported to the channel in which the mixture is stabilized. After stabilization, the mixture leaves the liquid outlet as heated milk froth.

It is a disadvantage of the known device that it requires frequent cleaning. Since milk is in contact with the components of the device during operation, these components become polluted with milk. If the device is not frequently cleaned, the device will become unhygienic because of milk residue and may cause health problems for its users. This risk is even greater because the construction of the device renders cleaning difficult, which may cause users to be reluctant to clean it.

It is an object of the invention to provide a device for preparing a heated liquid which is hygienic and user-friendly. To achieve this object, a device for preparing a heated liquid according to the invention is characterized in that the device for preparing a heated liquid comprises a cartridge in which the liquid reservoir, the liquid transport channel, the first chamber, the steam inlet, the restriction, the second chamber, and the liquid outlet are provided. All components of the device are integrated into one cartridge, so the cartridge can be discarded after use. In this manner all components which have been in contact with liquid during operation, and which are at risk of becoming contaminated by residues of the liquid, are removed and thrown away. Thus a hygienic device is provided which is also user-friendly because it does not have to be cleaned after use.

An embodiment of a device according to the invention designed for use with a beverage-making appliance is characterized in that the device is at least partly detachably connectable to the beverage-making appliance. In this manner the cartridge can be detached from the beverage-making appliance after having fulfilled its function and then be disposed of.

An embodiment of a device according to the invention is characterized in that the cartridge is detachably connectable to the appliance via the steam inlet. In this manner the device is in contact with the appliance only via the steam inlet, which means that no liquid present in the cartridge can come into contact with any part of the appliance. This ensures a hygienic solution without the need for the user to clean the device or the appliance.

An embodiment of a device according to the invention is characterized in that the liquid transport channel comprises an air inlet. In this manner air is entrained into the liquid during operation when the liquid is being transported from the reservoir via the transport channel to the first chamber. This air causes a frothing of the liquid, e.g. milk.

An embodiment of a device according to the invention is characterized in that the air inlet is closable. In this manner either heated liquid or heated frothed liquid can be generated by the device, depending on whether the air inlet is closed or opened, respectively.

It is advantageous when a valve is provided for opening and closing the air inlet.

An embodiment of a device according to the invention is characterized in that the liquid comprises milk. In another embodiment, the liquid comprises coffee extract.

An embodiment of a device according to the invention is characterized in that the first chamber comprises a water inlet which is connectable to a water reservoir. When condensed milk or liquid coffee extract is used as a liquid in the cartridge, additional water has to be mixed into said liquid to obtain a heated liquid of good quality. This is possible via the water inlet.

An embodiment of a device according to the invention is characterized in that at least the second chamber is provided with obstructions for enhancing the frothing of liquid in the second chamber during operation.

An embodiment of a device according to the invention is characterized in that the liquid reservoir is a refillable reservoir.

An embodiment of a device according to the invention is characterized in that the liquid reservoir is provided in an element which is moveable between a first position in which it covers the liquid transport channel, the first chamber, the steam inlet, the restriction, the second chamber, and the liquid outlet during operation, and a second position in which it leaves these components exposed for cleaning purposes in a non-operating status.

The invention further relates to a beverage-making appliance for use with a device for preparing a heated liquid according to the invention, characterized in that the appliance comprises a space for receiving the device for preparing a heated liquid.

An embodiment of an appliance according to the invention is characterized in that the appliance comprises a steam generator which is connectable to the steam inlet of the device upon receipt of the device in the space.

An embodiment of an appliance according to the invention is characterized in that the space comprises means for opening a liquid flow path between the reservoir and the liquid channel.

The invention further relates to a system for preparing a beverage, comprising a beverage-making appliance according to the invention and a device for preparing a heated liquid according to the invention.

An embodiment of a system according to the invention is characterized in that the appliance has a housing, and the liquid outlet of the device extends outside the housing of the appliance.

Figure 2A:
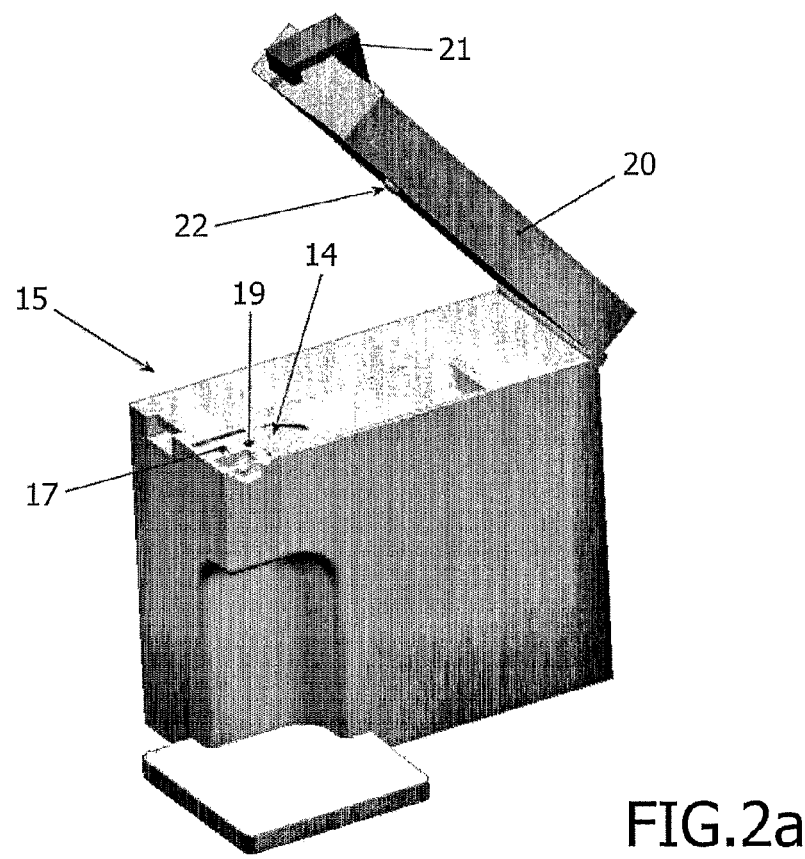
Figure 3:
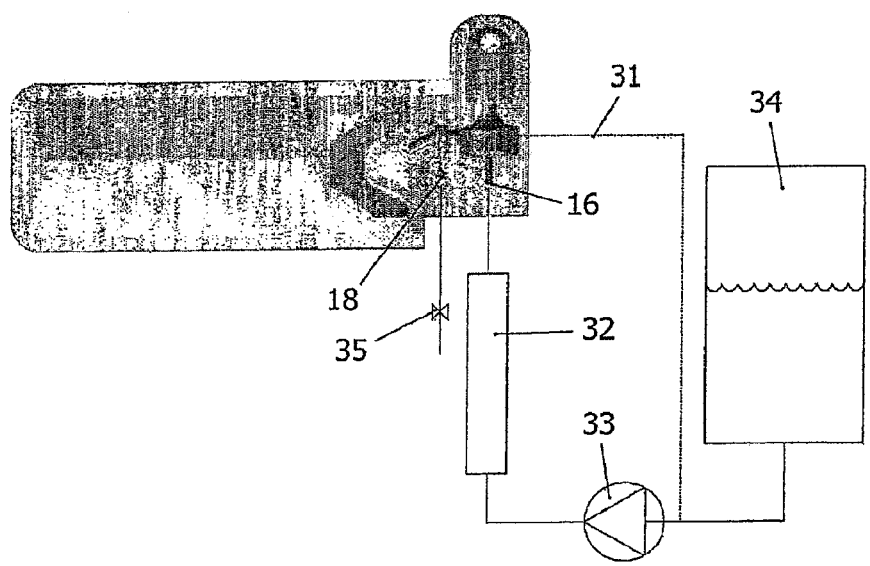
Figure 4:
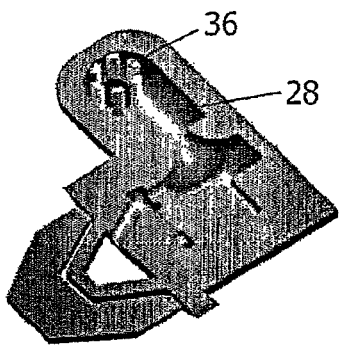

The invention will be described in more detail hereinafter with reference to the drawings, in which FIG. 1 is a perspective view of a first embodiment of a device according to the invention, FIGS. 2*a, b, c, d* show a system according to the invention in different stages of operation, FIG. 3 is a schematic view of a further embodiment of a system according to the invention, FIG. 4 shows a detail of a further embodiment of a device according to the invention, and FIGS. 5*a, b* show a detail of a further embodiment of a device according to the invention.

Figure 6:
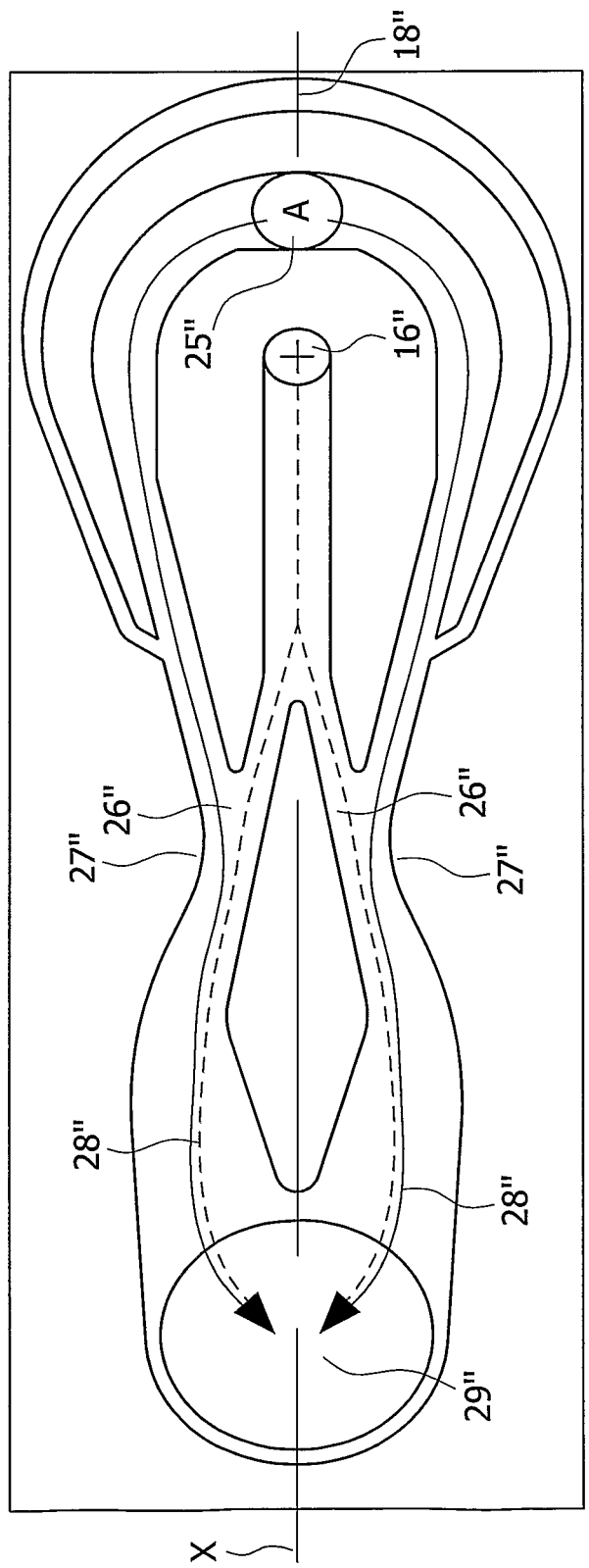
Figure 7:
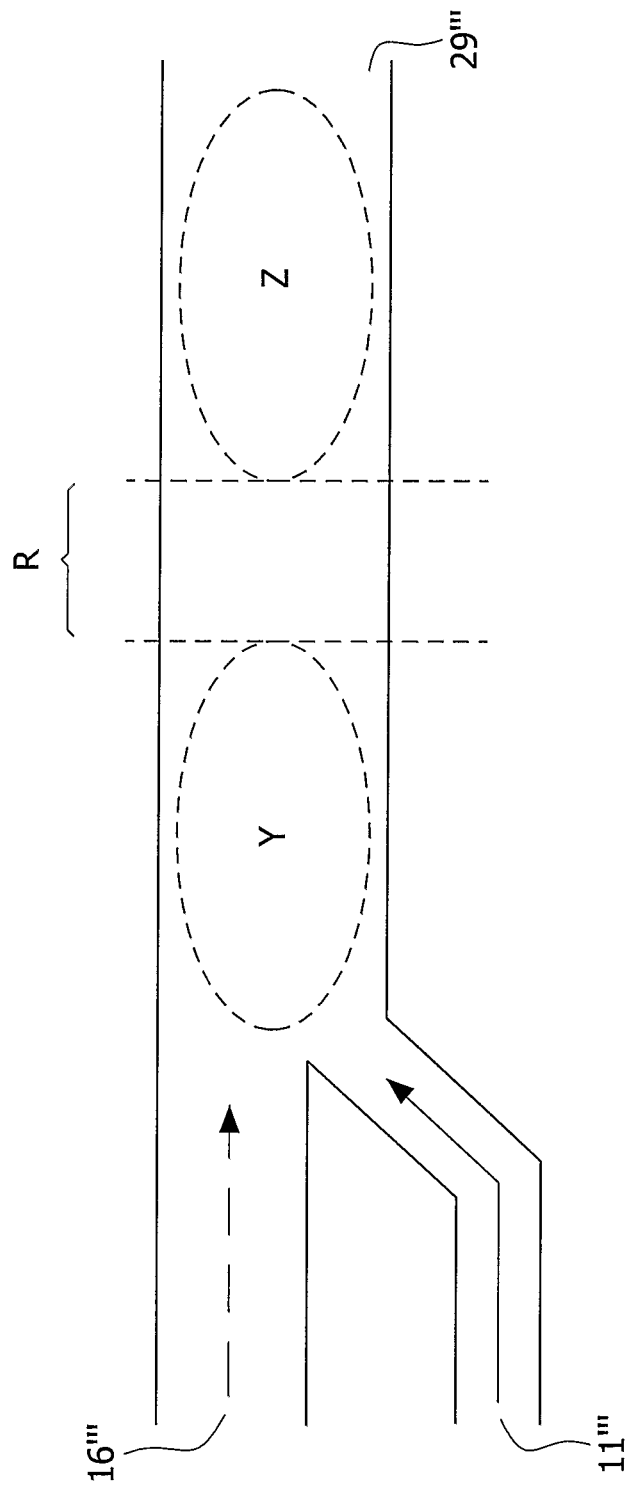

FIG. 6 is a schematic view of a further embodiment of a device according to the invention, and FIG. 7 shows a detail of a further embodiment of a device according to the invention.

FIG. 1 is a perspective view of a first embodiment of a device 1 for preparing a heated liquid according to the invention, for use with a beverage-making appliance 15, as shown in FIG. 2. The device 1 comprises a liquid transport channel 25 in communication with a liquid reservoir 11 which discharges into a first chamber 26, said first chamber 26 comprising a steam inlet 16 which is connectable to a steam generator 32. This will be further elucidated in the description of FIG. 3.

In this embodiment, the liquid comprises skimmed milk. However, it is noted that also other known types of liquid such as liquid coffee extract, syrup, etc. may be advantageously applied in a device according to the invention. Furthermore, the device comprises a second chamber 28 which is connected to the first chamber 26 via a restriction 27 and which has a liquid outlet 29. The device for preparing a heated liquid comprises a cartridge 100 in which the liquid reservoir 11, the liquid transport channel 25, the first chamber 26, the steam inlet 16, the restriction 27, the second chamber 28, and the liquid outlet 29 are provided and which is at least partly detachably connectable to the beverage-making appliance 15. In this embodiment, the cartridge 100 is detachably connectable to the appliance 15 via the steam inlet 16, and the liquid transport channel 25 comprises an air inlet 18. In this manner, a heated and frothed liquid is generated by the device. The air inlet 18 is connected to the transport channel 25 via a restriction 80 in this embodiment. It is noted that in an alternative embodiment the restriction may be provided in the beverage-making appliance. The cartridge may comprise only a steam inlet and no air inlet in a further alternative embodiment; then the device provides only a heated liquid, without froth.

A central part 2 of the cartridge 100 in this embodiment is made from plastic. The top part 4 is a flexible foil made of a material that fulfils requirements with respect to oxygen permeability. This foil 4 has been sealed or glued in a leak-free manner to a surface 5 of a central part 2. In this manner all hollow spaces and grooves of the cartridge are separate spaces interconnected by small channels. The bottom part 6 is also a foil made of the same material as part 4 (Both 4 and 6 have been drawn as transparent foils). At the outer edges 13, parts 6 and 4 have been sealed or glued together. Another section of foil 6 has been leak-free glued or sealed to section of central part 2. During storage and transport, the reservoir 11 between foils 4 and 6 is completely filled with milk. Topside 9 of the surrounding wall of trapezoidal space 10 is part of the sealing surface 5. This ensures that top foil 4 is also sealed in this position, which prevents milk flowing from reservoir 11 to space 10. The bottom side 12 of the surrounding wall of space 10 is an extension of sealing surface 7. This ensures that space 10 is separated from milk reservoir 11 also at the bottom side. The cartridge furthermore comprises a trapezoidal extension 23 of central part 2, which closes a milk flow path between the reservoir and the transport channel 25. In this embodiment the reservoir is made from a flexible material, but it is noted that it may comprise alternative types of material and may be for example, partly rigid. Furthermore, the extension is trapezoidal in this embodiment, but is noted that this element may also comprise other known shapes, depending on the specific embodiment of the cartridge.

The operation of the device and the appliance according to the invention, forming the system according to the invention, will be further elucidated on the basis of FIG. 2*a, b, c*, which show a system according to the invention, in different stages of its operation. As can be seen in FIG. 2*a*, the appliance 15 comprises a space 14 for receiving the cartridge 100, and a lid 20 and a lock 21 for locking the cartridge 100 in the space 14 during operation. The appliance furthermore comprises a steam socket 17 which is connectable to the steam inlet 16 of the cartridge 100, and an air socket 19 which is connectable to the air inlet 18. Furthermore means 22, in this embodiment an element protruding from the lid, are provided for opening a liquid flow path between the reservoir 11 and the liquid channel 25. It is noted that other known means may be applied to open this liquid flow path such as, for example, a pin to pierce the foil.

Figure 2B:
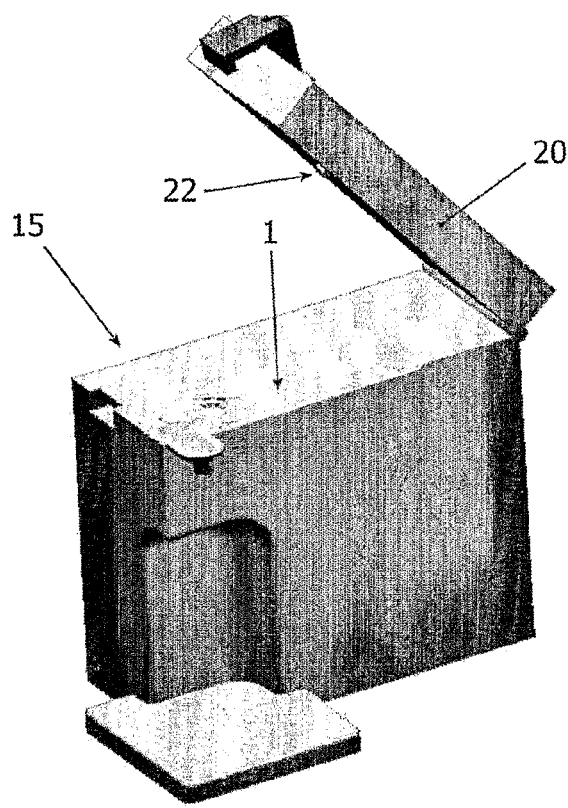
Figure 2C:
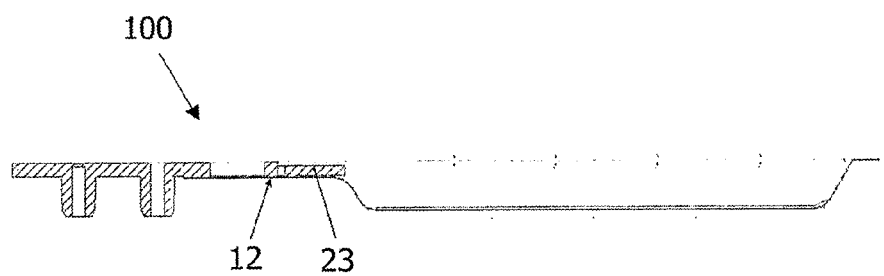
Figure 2C:
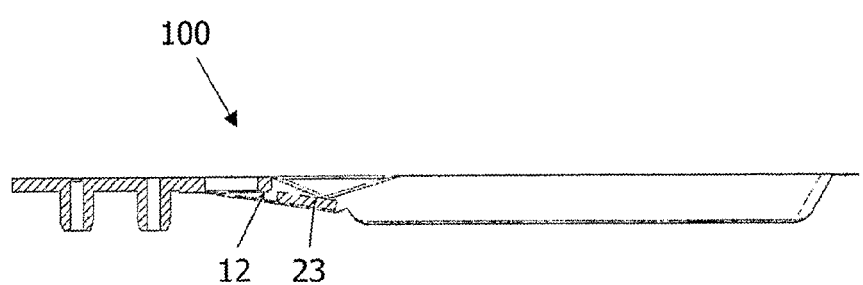

In FIG. 2*b*, the cartridge 100 has been placed in the appliance 15 by a user. Upon placement of cartridge 100 in the space 14 of appliance 15, the steam inlet 16 of the cartridge 100 connects to the steam socket 17 of the appliance 15. Closing appliance lid 20 and locking this with lock 21 pushes protrusion 22 in lid 20 into the cartridge 100. This changes the position of the trapezoidal extension 23 of central part 2 from the position A to the position B as shown in FIG. 2*c*. In this manner the foil 6 is peeled from the sealed position in 12, which enables milk to flow from reservoir 11 into space 10.

Figure 2D:
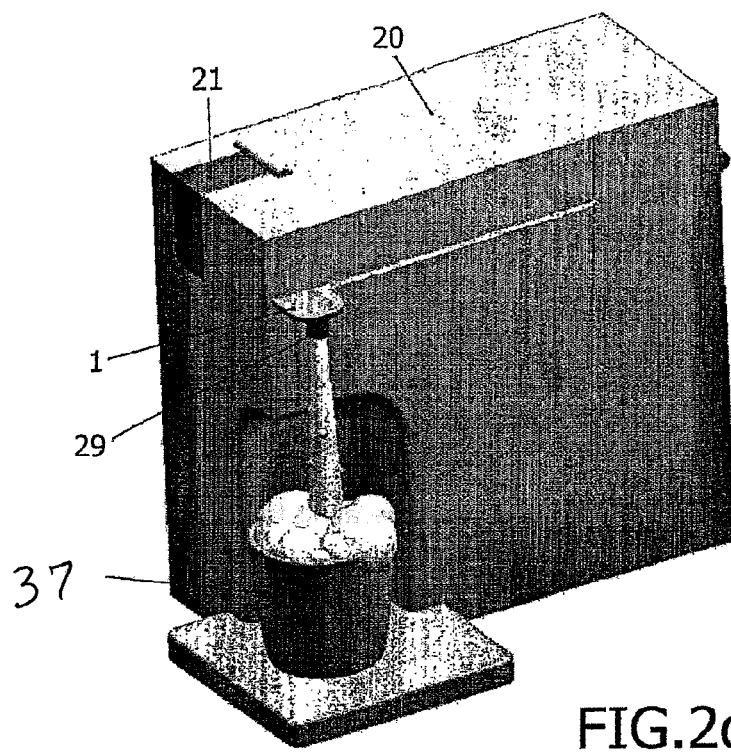

The heating and frothing process starts as soon steam enters the system through steam inlet 16. This activation of the steam may be initiated automatically after a pre-determined period of time after insertion of the cartridge or, for example, upon activation of a button on the appliance by a user. The speed of the steam between steam inlet 16 and restriction 27 creates a vacuum in first chamber 26, by means of which milk from the reservoir and air are drawn into the first chamber 26 via the liquid channel 25. The air is sucked into the milk through air inlet 18 via a small conduit 30. As soon the mixture of milk and air arrives in chamber 26, the hot steam implodes on the milk. In this manner the temperature of the milk is increased. The heated mixture then passes restriction 27 and has an opportunity to stabilize in space 28 before it leaves the cartridge through outlet 29 as a mix of hot milk and froth that flows into a receiving cup 37, as shown in FIG. 2*d*. As can also be seen in FIG. 2*d*, the liquid outlet 29 of the device extends outside the housing of the appliance 15. This ensures that no parts of the appliance will come into contact with the milk.

After the milk has left the outlet, the process is de-activated. Any milk residue in the cartridge will remain where it is, because there are no mechanisms causing the milk to flow back to the steam or air inlet. The lock 21 can be unlocked and the lid opened to remove the used cartridge 100. Upon removal of the cartridge, the connections between the steam socket 17 of the appliance 15 and the steam inlet 16 of the cartridge 100, and the air socket 19 of the appliance 15 and the air inlet 18 of the cartridge, are broken. The cartridge can then be thrown away, and a new cartridge can be placed if a new portion of heated, frothed milk is required.

It is noted that the beverage-making appliance in FIG. 2 is shown schematically only, and may comprise a variety of known types of beverage-making appliances of different sizes and shapes. The appliance may comprise, for example, a cup-by-cup coffee maker, a coffee maker with a drip filter, or an espresso machine.

It is furthermore noted that the cartridge according to the invention described above comprises skimmed milk. However, it is also possible to have a cartridge with condensed milk in order to reduce the total volume of the cartridge. In that case the milk must be diluted with water, as can be seen in FIG. 3 showing a further embodiment of the invention. FIG. 3 shows a schematic view of the appliance in connection with the cartridge according to the invention. Cold water is added to the condensed milk in the first chamber 26 through a water inlet 31 (dotted line). The water is then part of the mixture and will be heated together with the milk. A steam generator 32 forming part of the appliance supplies steam to the steam inlet 16 of the cartridge 100. The steam generator 32 is supplied with water from a water reservoir 34 by pump 33. Advantageously, the water inlet 31 also has a connection to this water reservoir 34, but it may alternatively have a separate water reservoir.

Furthermore, a valve 35 is provided for opening and closing the air inlet 18. In this embodiment, the valve 35 is comprised in the appliance, but it is noted that the valve may alternatively be comprised in the cartridge 100 itself. In this manner a choice can be made whether just heated liquid or heated and frothed liquid is to be provided by the system according to the invention. In addition, as described above, the cartridge may also have only a steam inlet and no air inlet, thus providing only heated liquid, without froth.

In order to improve froth quality and volume in a further embodiment, at least the second chamber 28 is provided with obstructions 36 for enhancing the frothing of liquid in the second chamber 28 during operation, as can be seen in FIG. 4. These obstructions change the flow resistance in the relevant space and/or create some extra agitation. The obstructions in this embodiment are arranged around the outlet, but in other embodiments they may be arranged in a different location in the second chamber, or even additionally in the other chamber.

Figure 5A:
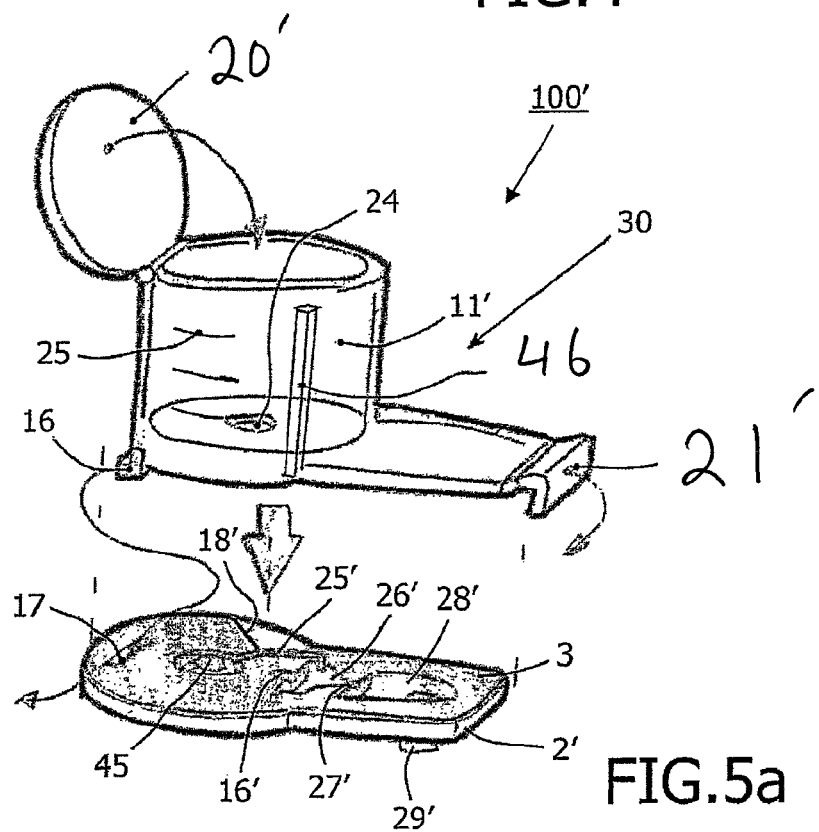
Figure 5B:
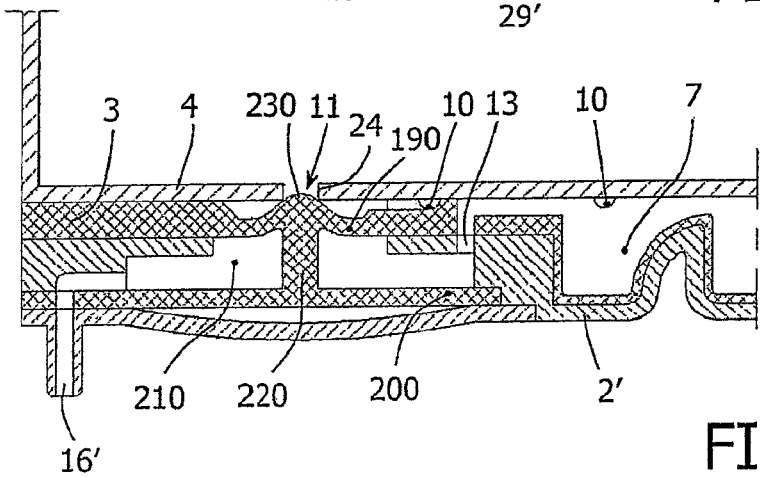

FIGS. 5*a* and 5*b* show a further embodiment of a device according to the invention, in which the liquid reservoir 11' is a refillable reservoir. The liquid reservoir 11' is provided in an element 30 which is moveable between a first position in which it covers the air inlet 18', the liquid transport channel 25', the first chamber 26', the steam inlet 16', the restriction 27', the second chamber 28', and the liquid outlet 29' during operation, and a second position in which it leaves these components exposed for cleaning purposes in a non-operating status. It is noted that the liquid reservoir may be detachably connected to the device.

In this manner, the cartridge 100' can be refilled by a user and can be easily cleaned by hand, or in the dishwasher. The cartridge 100' comprises a bottom part 2' with on its topside a cover 3, a milk reservoir 11', a hinged lid 520', and a lock 21'. The cover 3 is made of a flexible material such as, for example, rubber and is tightly and leak-free fixed to the topside of the bottom part 2'. It is noted, however, that in other embodiments the cover may comprise other known types of material and may be, for example, partly rigid.

Bottom part 2' comprises the liquid transport channel 25', the first chamber 26', the steam inlet 16', the restriction 27', the second chamber 28', and the liquid outlet 29'. The milk reservoir 11' is fixed to the bottom part 2' by hooking extension 16 in groove 17 and by closing lock 21'. This total assembly can be placed on an appliance interface in the same way as the disposable cartridge 100 described above, where it engages with a steam socket and optionally with an air and water connector.

In this embodiment, the user can refill the cartridge with fresh liquid, in this embodiment milk. This creates the need for preventing milk from flowing to the frothing device prior to starting of the steaming process. This is done via a liquid valve 45 as shown in FIG. 5*a*, and in more detail in FIG. 5*b*. Valve 45 comprises top flange 190 and bottom flange 200. Top flange 190 has a smaller diameter than bottom flange 200, and connector 220 connects these flanges. With milk reservoir 11' assembled to bottom part 2' and without steam pressure in space 210, the top of the valve 230 closes hole 24 in milk container 4, thus preventing milk from leaking out. When steaming starts, steam flows through space 210 and enters the first chamber 26' through steam inlet 16'. At the same time steam pressure builds up between flanges 19 and 20. Since the surface area of flange 20 is larger than that of flange 19, the force on the bottom side of the system will be higher than on the topside. As a result bottom flange 20 pulls top flange 19 down through connector 22. This opens hole 24 so that milk can flow to the first chamber 26' via transport channel 25'. As soon as the steam pressure drops below a certain level, valve 45 closes immediately. This system provides a direct coupling between steam and milk flow without a drop in steam pressure. It is noted that other known types of valves may be applied in a device according to the invention.

Milk reservoir 11' can be refilled through lid 20' without taking the whole cartridge 100' from the appliance. For the purpose of refilling the reservoir 11', the outside of the transparent reservoir is provided with level indicator lines 25. To provide a more accurate measurement, the reservoir is further provided with an electronic volume-measuring device 46 in this embodiment; it is noted, however, that other embodiments may comprise only the level indicator lines 25 or the volume-measuring device 46.

The complete device is detached from the appliance for cleaning. Upon unlocking of lock 21' the cartridge 100' can be further disassembled. All channels and spaces which have been in contact with milk are then easy accessible for cleaning. Only space 210 is not accessible, but this space has only been in contact with steam and therefore poses no hygienic risks.

FIG. 6 shows a further embodiment of a device according to the invention. In this embodiment, the operation of the device is comparable to the operation of the earlier described embodiments.

The heating and frothing process starts as soon steam enters the system through steam inlet 16". The steam has been indicated by a dotted line in FIG. 6. This activation of the steam may be initiated automatically after a pre-determined period of time after insertion of the cartridge, or for example upon activation of a button on the appliance by a user.

The liquid reservoir, which is not shown in this Figure, is connected to the liquid channel 25", of which the starting point is indicated in the Figure at A. The flow of liquid is indicated with a continuing line.

The speed of the steam between steam inlet 16" and restriction 27" creates an underpressure in first chamber 26", by means of which milk from the liquid reservoir and air are drawn into the first chamber 26". The air is sucked into the milk through the air inlet 18". As soon the mixture of milk and air arrives in chamber 26", the hot steam implodes on the milk. In this manner the temperature of the milk is increased. The heated mixture then passes restriction 27" and gets the opportunity to stabilize in space 28" before it leaves the cartridge through outlet 29" as a mix of hot milk and froth that flows into a receiving cup. After the milk has left the outlet, the process is de-activated. Any milk residue in the cartridge will remain where it is, because there are no mechanisms causing the milk to flow back to the steam- or air inlet.

In this manner all components which have been in contact with liquid during operation, and which run the risk of becoming contaminated by residues of liquid, can be removed and thrown away because they are integrated into one cartridge. Thus a hygienic device is provided which is also user-friendly because it does not have to be cleaned after use.

It is noted that in this embodiment, a mirrored configuration of the components along the longitudinal axis X of the cartridge is applied. It will be understood however, that in another embodiment, other configurations are possible, comprising for example only half of the described configuration.

FIG. 7 shows a detail of a further embodiment of a device according to the invention. It is noted that the configuration of the restriction R can be realized in various ways, as long as an underpressure is created to entrain liquid from the reservoir in the steam flow. In earlier described embodiments, the restrictive function was performed by for example a narrowing channel.

However, it is noted that this function may also be realized by for example making use of the length of the channel between the space Y where the steam from steam inlet 16''' and liquid from the reservoir 11''' come together, and the space Z where their mixture is settled before leaving the outlet 29''', as shown in FIG. 7.

It is noted that a device for preparing a heated liquid according to the invention may be used separately from a beverage-making appliance. It then functions as a stand-alone device and only needs a connection to a steam generator to generate a heated liquid, and optionally an air inlet if frothing is wanted. In this case it may even be used as a beverage-making device in itself if the liquid in the reservoir comprises liquid coffee extract.

Furthermore, it may be used together with a beverage-making appliance such as a coffee or espresso maker.

It is furthermore possible to removably attach two cartridges to a beverage-making appliance, one with a reservoir comprising milk, and one with a reservoir comprising liquid coffee extract. The cartridges may be attached to the appliance together at one interface, or successively, first the coffee cartridge, followed by the milk cartridge.

Furthermore, the cartridge may comprise, in a location upstream of the liquid outlet, an inlet connected to a reservoir for holding dry substances such as, for example, cocoa powder. In this manner, the dry substances can be added to the heated and possibly frothed liquid, in this case, for example, cocoa powder can be added to the heated and frothed milk, resulting in a hot frothed cocoa milk coming from the liquid outlet.

It is noted that the cartridge has a relatively flat construction in the embodiments described. The cartridge, however, may also comprise other shapes and dimensions, depending on, for example, its use with different types of beverage-making appliances, or the specific liquid to be held in the reservoir. The cartridge may, for example, also be shaped like a cup, a sphere, a cube, etc. Furthermore, the various components integrated in the cartridge may have configurations in said cartridge with respect to each other than those described with the embodiments mentioned above.

It is furthermore noted that with the chambers, as described with an earlier described embodiment is meant any area in which liquid can be held. They may comprise any type of area such as a cavity, or a space, but also, for example, a channel, as long as liquid can be held herein.

The invention claimed is:

1. A device for preparing a heated liquid using a beverage-making appliance, said device comprising:
    a reservoir that sealably holds a liquid in a sealed foil;
    a chamber;
    a liquid transport channel in communication with the reservoir for transporting the liquid when the reservoir is unsealed to the chamber;
    a steam inlet which is connectable to a steam generator of the beverage-making appliance for generating steam and heating the liquid flowing out of the liquid transport channel to form the heated liquid;
    a liquid outlet for outputting the heated liquid;
    a guide configured to transport a combined flow of at least the liquid and the steam to the liquid outlet; and
    a cartridge in which the reservoir, the chamber, the liquid transport channel, the guide, and the liquid outlet are provided, wherein the cartridge is detachably connected to the device beverage-making appliance and the cartridge is disposable after the sealed foil is unsealed.

2. The device as claimed in claim 1, wherein the guide comprises a further chamber, wherein the liquid transport channel discharges into the chamber, and said chamber comprises the steam inlet, and wherein the further chamber is connected to the chamber via a restriction and comprises the liquid outlet.

3. The device as claimed in claim 1, wherein the cartridge is detachably connectable to the appliance via the steam inlet.

4. The device as claimed in claim 1, wherein said liquid transport channel comprises an air inlet.

5. The device as claimed in claim 4, wherein the air inlet is closable.

6. The device as claimed in claim 5, wherein a valve is provided for opening and closing the air inlet.

7. The device as claimed in claim 1, wherein the liquid comprises milk.

8. The device as claimed in claim 1, wherein the liquid comprises liquid coffee extract.

9. The device as claimed in claim 1, wherein the chamber comprises a water inlet which is connectable to a water reservoir.

10. The device as claimed in claim 2, wherein at least the further chamber is provided with obstructions for enhancing frothing of liquid in the further chamber during operation.

11. The device as claimed in claim 1, wherein the reservoir is a refillable reservoir.

12. The device as claimed in claim 11, wherein the reservoir is provided in an element which is moveable between a first position in which the element covers components including the liquid transport channel, the chamber, the steam inlet, the restriction, the further chamber, and the liquid outlet during operation, and a second position in which the element leaves the components exposed for cleaning purposes in a non-operating status.

13. The device as claimed in claim 1, wherein the beverage-making appliance comprises a space for receiving the device for preparing the heated liquid.

14. The device as claimed in claim 13, wherein the beverage-making comprises the steam generator which is connectable to the steam inlet of the device upon receipt of the device in the space.

15. The device as claimed in claim 14, wherein the beverage-making appliance comprises means for opening a liquid flow path between the reservoir and the liquid channel.

16. The device of claim 1, the reservoir is unsealed in response to providing the device in beverage-making appliance.

17. The device of claim 1, further comprising: an air inlet connectable to an air socket of the beverage-making appliance for providing air to form the liquid from the reservoir with froth, wherein the air inlet is connected to the liquid transport channel via a first restriction; wherein the chamber is configured to receive the steam from the steam generator of the beverage-making appliance and the liquid from the reservoir including the froth to form the heated liquid with the froth in the chamber and providing the heated liquid with the froth to a further chamber via a second restriction to enhance the froth, wherein the liquid outlet is connected to the further chamber for output of the heated liquid with the froth.

18. The device of claim 1, further comprising an air inlet connectable to an air socket of the beverage-making appliance for providing air to form the liquid from the reservoir with froth; wherein the chamber is configured to receive the steam from the steam generator of the beverage-making appliance and the liquid from the reservoir including the froth to form the heated liquid with the froth in the chamber and output the heated liquid with the froth through the liquid outlet of the device.

19. A cartridge for preparing a heated liquid using a beverage-making appliance, said cartridge comprising:
 a reservoir that sealably holds a liquid in a sealed foil;
 a compartment;
 a channel between the reservoir and the compartment;
 a steam inlet which is connectable to a steam generator of the beverage-making appliance for providing steam into the compartment for heating the liquid provided into the compartment to form the heated liquid; and
 a liquid outlet for outputting the heated liquid;
 wherein the cartridge is detachable from the beverage-making appliance and the cartridge is disposable after the sealed foil is unsealed.

20. The cartridge of claim 19, wherein the reservoir is unsealed in response to providing the device in the beverage-making appliance.

21. The cartridge of claim 19, wherein the sealed foil which is pierceable by a protrusion of a cover of the beverage-making appliance when the cover is closed over the cartridge.

22. The cartridge of claim 19, wherein the cartridge is a single use cartridge for discarding after a single use of preparing the heated liquid by the beverage-making appliance.

23. The cartridge of claim 19, wherein the liquid present in the reservoir does not come into contact with the beverage-making appliance.

24. The device of claim 1, wherein the liquid outlet of the cartridge outputs the heated liquid directly into a cup so that the liquid present in the reservoir does not come into contact with the beverage-making appliance.

25. The cartridge of claim 19, wherein the liquid outlet outputs the heated liquid directly into a cup so that the liquid present in the reservoir does not come into contact with the beverage-making appliance.

* * * * *